US008713091B2

(12) United States Patent
Phillips et al.

(10) Patent No.: US 8,713,091 B2
(45) Date of Patent: Apr. 29, 2014

(54) NETWORK BASED JIT ON A PRIORI KNOWLEDGE OF A SET OF DISPARATE CLIENTS

(75) Inventors: Thomas G. Phillips, Bellevue, WA (US); Zhangwei Xu, Redmond, WA (US); Martin Harm Hall, Sammamish, WA (US); Dana L. Silverstein, Duvall, WA (US); Shawn Amelia Prenzlow, Woodinville, WA (US); Martin Holladay, Bremerton, WA (US)

(73) Assignee: Microsoft Corporation, Redmond, WA (US)

( * ) Notice: Subject to any disclaimer, the term of this patent is extended or adjusted under 35 U.S.C. 154(b) by 663 days.

(21) Appl. No.: 12/245,536

(22) Filed: Oct. 3, 2008

(65) Prior Publication Data
US 2010/0088359 A1 Apr. 8, 2010

(51) Int. Cl.
*G06F 15/16* (2006.01)

(52) U.S. Cl.
USPC .......................................... 709/203; 709/221

(58) Field of Classification Search
USPC ......................................... 709/220, 221, 227
See application file for complete search history.

(56) References Cited

U.S. PATENT DOCUMENTS

| 6,430,624 | B1 | 8/2002 | Jamtgaard et al. |
| 6,741,853 | B1 | 5/2004 | Jiang et al. |
| 7,130,616 | B2 | 10/2006 | Janik |
| 7,139,843 | B1 | 11/2006 | Brown et al. |
| 7,233,790 | B2 * | 6/2007 | Kjellberg et al. ............. 455/419 |
| 7,444,337 | B2 * | 10/2008 | Zhou et al. ............................. 1/1 |
| 7,506,021 | B2 * | 3/2009 | Polan et al. .................... 709/201 |
| 7,587,712 | B2 * | 9/2009 | Mountain et al. ............. 717/148 |
| 7,602,725 | B2 * | 10/2009 | Vaught ....................... 370/236.2 |
| 7,870,153 | B2 * | 1/2011 | Croft et al. .................... 707/781 |
| 2001/0034791 | A1 | 10/2001 | Clubb et al. |
| 2003/0041131 | A1 * | 2/2003 | Westerinen et al. .......... 709/221 |
| 2003/0110234 | A1 | 6/2003 | Egli et al. |
| 2006/0129638 | A1 | 6/2006 | Deakin |
| 2008/0052414 | A1 | 2/2008 | Panigrahi et al. |

OTHER PUBLICATIONS

Farley, P., Capp, M.: Mobile Web Services. BT Technology Journal 23(3), 202-213 (2005) [retrieved on Apr. 22, 2010 from the Internet = "http://www.springerlink.com/content/xp6t31k111537474/fulltext.pdf"].*

Kuno, H., & Sahai, A (2002). My agent wants to talk to your service: personalizing web services through agents. Proceedings of the First International Workshop on Challenges in Open Agent Systems, Bolona. [retrieved on Apr. 22, 2010 from the Internet "http://www.hpl.hp.com/techreports/2002/HPL-2002-114.pdf"].*

(Continued)

*Primary Examiner* — Saleh Najjar
*Assistant Examiner* — Shu Chun Gao
(74) *Attorney, Agent, or Firm* — John Jardine; Andrew Sanders; Micky Minhas

(57) ABSTRACT

Network based just-in-time compilation based on A Priori knowledge of a set of disparate clients is disclosed. One embodiment comprises using a web service to register a device and store a device profile containing the capabilities of the device, receiving a request from the device to subscribe to a content service, and to create a client runtime for the device for a requested service corresponding to the device capabilities. In this way, the embodiment may send the client runtime to the device to allow the device to communicate with the content service through the web service.

17 Claims, 4 Drawing Sheets

(56) References Cited

OTHER PUBLICATIONS

Berger, S.; McFaddin, S.; Chandra Narayanaswami; Mandayam Raghunath;"Web services on mobile devices-implementation and experience" Mobile Computing Systems and Applications, 2003. Proceedings. Fifth IEEE Workshop on; 2003, pp. 100-109 [retrieved from IEEE database on Oct. 19, 2010].*

Radu Teodorescu and Raju Pandey, "Using JIT Compilation and Configurable Runtime Systems for Efficient Deployment of Java Programs on Ubiquitous Devices", Ubicomp 2001: Ubiquitous Computing Lecture Notes in Computer Science, 2001, vol. 2201/2001, 76-95. [retreived from SpringerLink database on Dec. 15, 2011].*

J. Dunlop et al., "A Personal Distributed Environment for Future Mobile Systems," Proc. IST Summit, Jun. 2003. [retrieved from Internet on Dec. 10, 2012].*

Gupta, Rahul Kumar, "Application Architecture for Disparate Client Support", Dated: Jan. 26, 2004, 8 Pages.

"Device Management System", http://www.gingerall.com/ga-dms.html.

Manoharan, Sathiamoorthy, "Dynamic Content Management and Delivery for Mobile Devices", International Conference on Mobile Ubiquitous Computing, Systems, Services and Technologies, 2007 (UBICOMM apos;07), Dated: Nov. 4-9, 2007, pp. 63-67.

* cited by examiner

NETWORK BASED JIT ON A PRIORI KNOWLEDGE OF A SET OF DISPARATE CLIENTS

BACKGROUND

The number, type and functionality of digital devices are increasing, and consumers are conducting an increasing amount of their computing on these devices. Users are managing an increasing number of devices, such as cell phones, digital music players, PCs, digital cameras, gaming consoles, personal digital assistants (PDA), etc. Additionally, digital devices have a wide variety of technologies for creating and consuming content. These devices often do not share content and services that are important to the user. Further, the capacities of these devices often vary, for example, they may have a different processor type, a different memory capacity, etc. Additionally, these devices may have different capabilities such as network availability, different runtimes/binaries, different displays, different audio hardware, different operating systems, as examples.

Currently the range of capabilities and capacities of digital devices are addressed by developers writing different versions of programs. This approach results in duplicated efforts, increased costs, and user difficulty in configuring a similar application on different devices.

SUMMARY

Accordingly, various embodiments for network based just-in-time (JIT) compilation based on A Priori knowledge of a set of disparate clients are described below in the Detailed Description. For example, one embodiment comprises using a web service to register a device and store a device profile containing the capabilities of the device, receiving a request from the device to subscribe to a content service, and to create a client runtime for the device for a requested service corresponding to the device capabilities. In this way, the embodiment may send the client runtime to the device to allow the device to communicate with the content service through the web service. Other embodiments are described in the detailed description below and the appended claims and their equivalents.

This Summary is provided to introduce concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
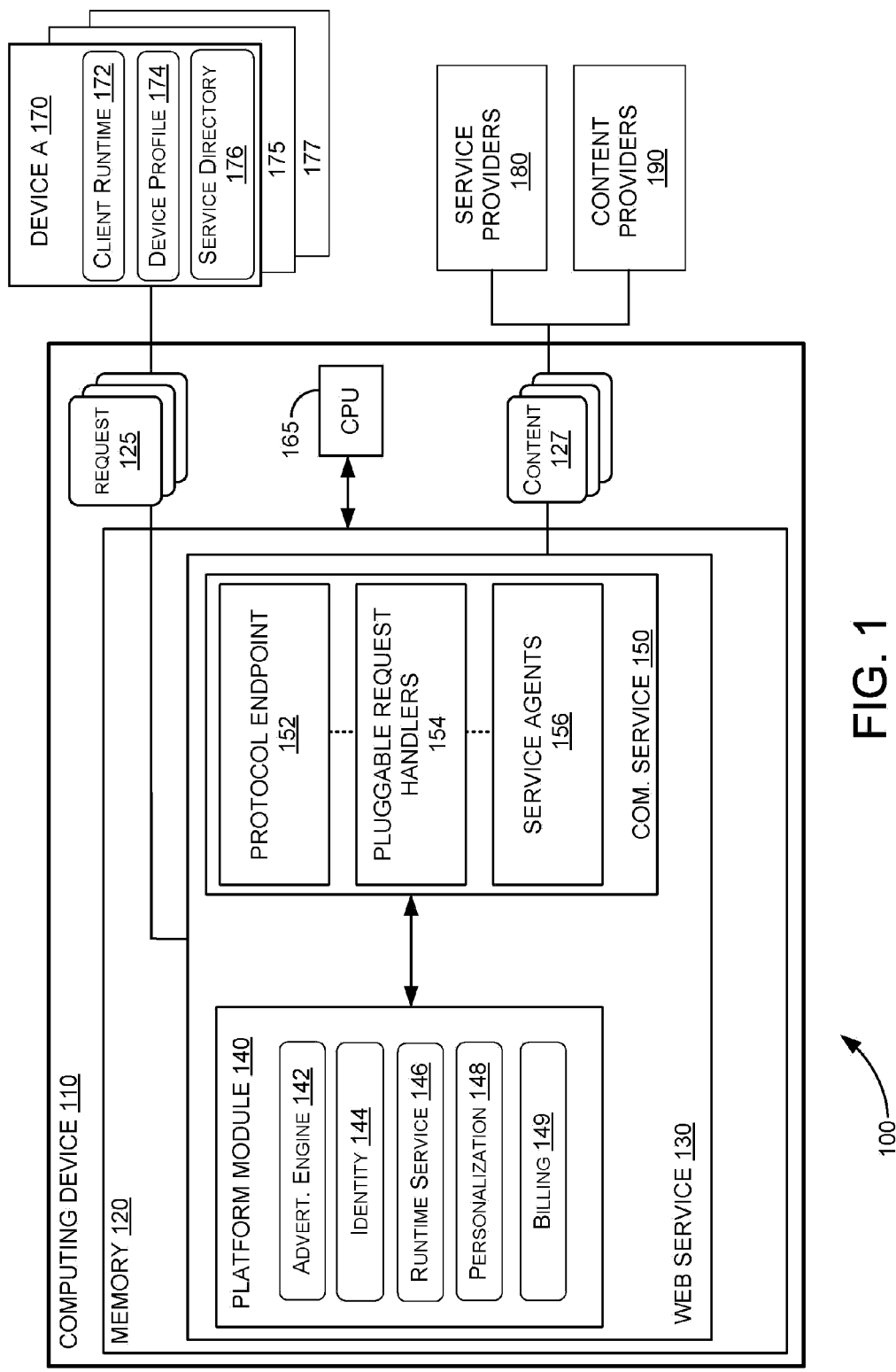
FIG. 1 shows an example of an embodiment for network based just-in-time (JIT) compilation of runtime files based on A Priori knowledge of a set of disparate clients.

FIG. 1 illustrates an example environment 100 to provide network based just-in-time (JIT) compilation of runtime files, also called client applications, for a set of disparate devices. In some embodiments, environment 100 aggregates device specific information and settings into a web service to enable the web service to provide JIT delivery of content to disparate clients to adapt to different device capabilities, JIT creation of client runtimes based on device capacities and capabilities, and provides an application level interface that functions across multiple JIT and runtime environments. Further, the web service may register devices and retain device profiles, associate user identities with multiple devices to provide personalized services across the devices, and provide a service directory to allow users to subscribe to a range of service in the directory.

Environment 100 includes computing device 110 including at least one input, a CPU 165, a memory 120, and a web service 130. Computing device 110 communicates with one or more of a plurality of devices including device 170, device 175 and device 177, and with service providers 180 and content providers 190. In other embodiments computing device 110 may be implemented on a distributed computing platform, or on other suitable platforms that provide network based JIT compilation of runtime files for one or more remote devices.

Web service 130 includes a platform module 140 and a communication service 150. Platform module 140 may include an advertising engine 142, an identity service 144, a runtime service 146 to manage device capability profiles and dynamically create binaries which are appropriate for each of the devices, a personalization service 148, and a billing service 149. Other embodiments are not limited to the illustrated engine and services, and may include other suitable groups of services. We now refer to FIG. 1 to provide a more detailed example of computing device 110 creating a client runtime 172.

In one embodiment, computing device 110 includes a web service 130 to register at least one device 170 and store a device profile 174 comprising device capabilities in memory 120, a protocol endpoint 152 to receive a request 125 from the device to subscribe to a content service and receive content 127 from content providers 190 or service providers 180. Computing device 110 also includes a runtime service 146 to create a client runtime 172 for the device 170 corresponding to the device capabilities contained in the device profile 174, wherein the client runtime is configured to communicate with the content service when run on the device 170. In this way, a communication service 150 may provide communication between the client runtime 172 on the device 170 and the content service running on service providers 180 and content providers 190.

In some embodiments, web service 130 may acquire the capabilities of a device 170 and dynamically create a client runtime 172 specifically for that device. As an example, services are often designed for a specific device, such as a desktop personal computer (PC), making it difficult to run a service on a different device. As users have an increasing number of devices, the problem of services only being written for specific devices increases.

For example, if a user tries to run a service created for a PC on a cellular phone with a small screen and with limited computing power, then the user experience may be compromised. Continuing with this example, by acquiring device capabilities and creating a runtime specifically for that device, the web service 130 can detect a service is going to run on a mobile phone with a limited bandwidth at 256K with a screen resolution (320-by-240), and create the runtime file accordingly. In another example, a runtime for a laptop or TV may be created specifically for streaming media in high-definition HD as opposed to the smaller size resolution on the mobile phone.

The web service 130 therefore also provides a centralized functionality to create client runtimes that scales effectively as the number of services or devices increases. As an example, if a client runtime is written for a phone that uses a JAVA runtime environment, that runtime would not work on a mobile phone that uses Windows Mobile Client. Without web service 130, a developer would create multiple versions of the client runtime to run on the two devices. Web service 130 and runtime service 146 operate to dynamically create client runtimes according to device capabilities and capacities. Device capabilities may include a device capability at a user interface level, a transport level, or a protocol level, etc., as non-limiting examples.

In some embodiments, web service 130 further comprises an identity service 144 to associate at least one user identity corresponding to a plurality of services with the device 170. In this way, the web service 130 uses the identity service 144 to log in to at least one of the plurality of services in response to a device authentication. For example, identity service 144 provides a centralized platform as a gateway to online services for multiple devices to in turn associate a user with a specific identity, and provide services according to the identity. Additionally, the identity service 144 can manage passwords and identities to authenticate the device as opposed to just authenticating a user on a per session basis, in turn allowing a user to be authenticated to services by using that authenticated device.

In some embodiments, the web service 130 is configured to provide a service directory 176 corresponding to the plurality of services, and the runtime service 146 is configured to create a client runtime for the device corresponding to at least one of the plurality of services in the service directory 176 in response to a subscription request. Further, the runtime service 146 may be configured to create a client runtime 172 for the device corresponding to a user selected group of services out of the plurality of services in the service directory 176. In some embodiments, the web service 130 is configured to register a plurality of devices having a plurality of device profiles, and may be further configured to create a corresponding plurality of client runtimes for the plurality of devices.

In some embodiments, communication service 150 may further comprise a pluggable request handler 154 to provide additional functionality to the device 170 to communicate with a content service running on service providers 180 or content providers 190. As an example, the additional functionality may include at least one of media transcription, content caching, or protocol conversion, etc. When a request is received from a device, a protocol endpoint 152 receives the request and a pluggable request handler 154 may be used to extend the functionality of web service 130 to a new type of request. Protocol endpoint 152 allows services to be exposed on different protocols to different devices according to the protocols the device is capable of using, which protocol is suited for a particular purpose, etc.

In one pluggable request handler 154 example, a device submits a request to a social networking website to inquire what the most popular movie is of the current month within a list of friends. In response to the request, the web service 130 may then provide a server side pluggable request handler 154 to implement the social networking website API's, which may then return information tailored to a specific device and capabilities. In another example pluggable request handler 154, a device with limited display capabilities may attempt to access a graphics intensive web-based email service. A client runtime can be generated that provides a text-based representation of the email service, and the device can access the email service through communication service 150.

In some embodiments, communication service 150 may include service agents 156 that may function as a service broker or service proxy that can communicate with multiple external API's and protocols. In the illustrated example, service agents 156 may function as a service broker between service providers 180 and content providers 190.

Referring back to platform module 140, in some embodiments, advertising engine 142 may provide a platform that can customize the delivery of advertisements to multiple devices, measure advertising metrics such as hit rates of those advertisements, etc. Furthermore, billing service 149 may provide an infrastructure that can separate billing features from specific services. For example, billing service 149 can maintain the infrastructure to manage a credit card transaction, can persist user or privacy information related to a credit card number, etc. In this way, independent service providers may utilize the billing service 149 independent of the actual service being billed for.

Additionally, personalization service 148 may provide a centralized service for customization of services that are provided through web service 130. For example, a user may personalize a radio service provided through web service 130 so that a news service is played when the user enters their car. In this way, the web service can provide a relevant portion of services to a device according to a centralized personalization by a user. In another example, a user may configure personalization service 148 to only provide a traffic drive time between two places as opposed to including information related to a traffic accident, etc.

Figure 2:
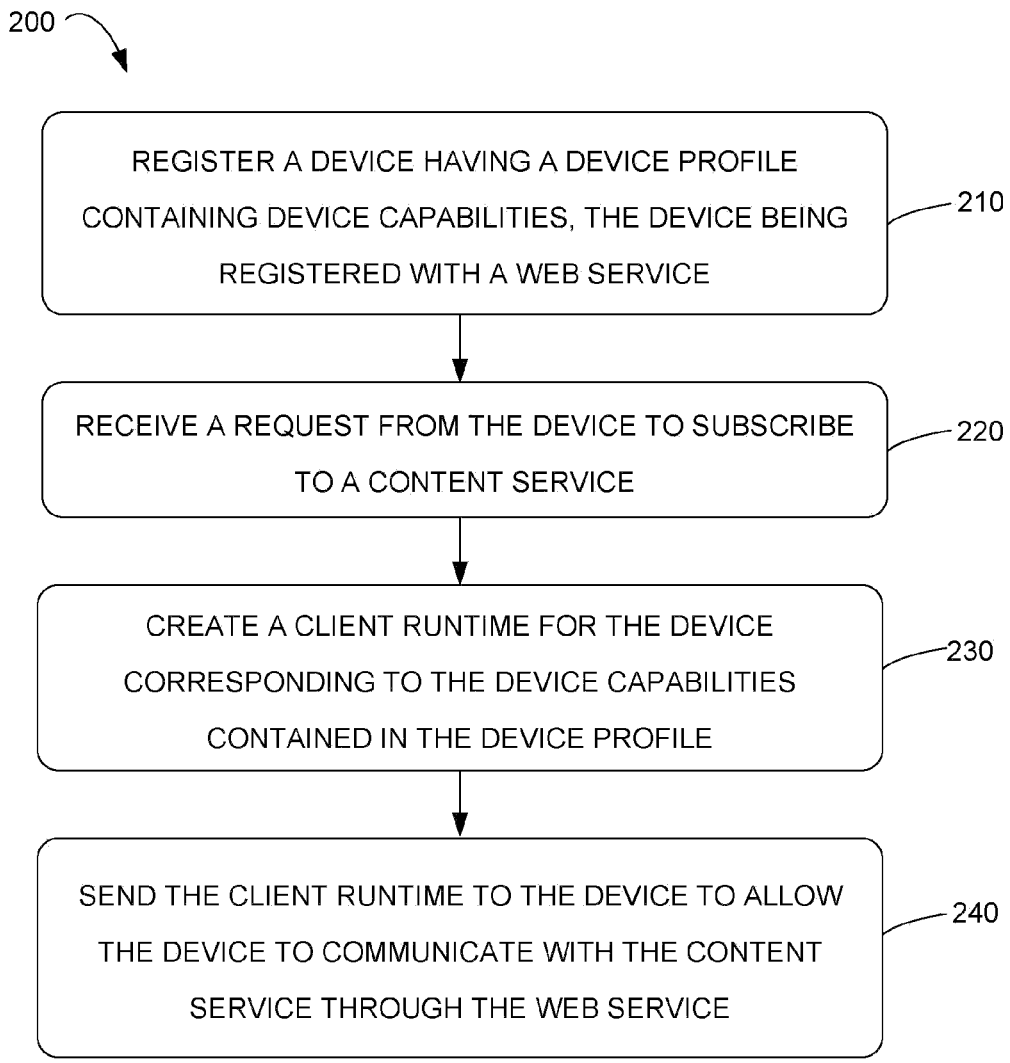
FIG. 2 shows a block diagram of embodiments of a method for network based JIT compilation of runtime files for a set of disparate clients.

FIG. 2 shows a block diagram of an embodiment of a method 200 for providing network based just-in-time compilation. In other embodiments, method 200 may provide functionality described in reference to web service 130, or other functionalities within the scope of this description and the appended claims. We now turn to block 210 where method 200 comprises using a web service to register a device having a device profile containing device capabilities, for example device capability at a user interface level, a transport level, or a protocol level. The device profile may then be stored to later provide network based just-in-time compilation without having to retrieve the device profile.

Method 200 also comprises receiving a request from the device to subscribe to a content service, as indicated in block 220. In some embodiments, method 200 may further comprise providing a service directory on the device corresponding to the plurality of services, and creating a client runtime for the device corresponding to at least one of the plurality of services in the service directory in response to a subscription request.

Next, method 200 comprises creating a client runtime for the device corresponding to the device capabilities contained in the device profile, as indicated at 230. In block 240, the method comprises sending the client runtime to the device to provide functionality for the device to communicate with the content service through the web service.

In some embodiments, method 200 may further comprise associating at least one user identity corresponding to a plurality of services with the device, and logging in to at least one of the plurality of services in response to a device authentication. In yet another embodiment, method 200 may further comprise connecting the device with the content service, and providing additional functionality to the device to communicate with the content service in response to a pluggable request handler on the device.

In some embodiments, method 200 further involves registering a first device having a first device profile, registering a second device having a second device profile, and creating a client runtime for the second device corresponding to a device capability contained in the second device profile. In this way client runtimes may be generated in a centralized place for a plurality of devices.

Figure 3:
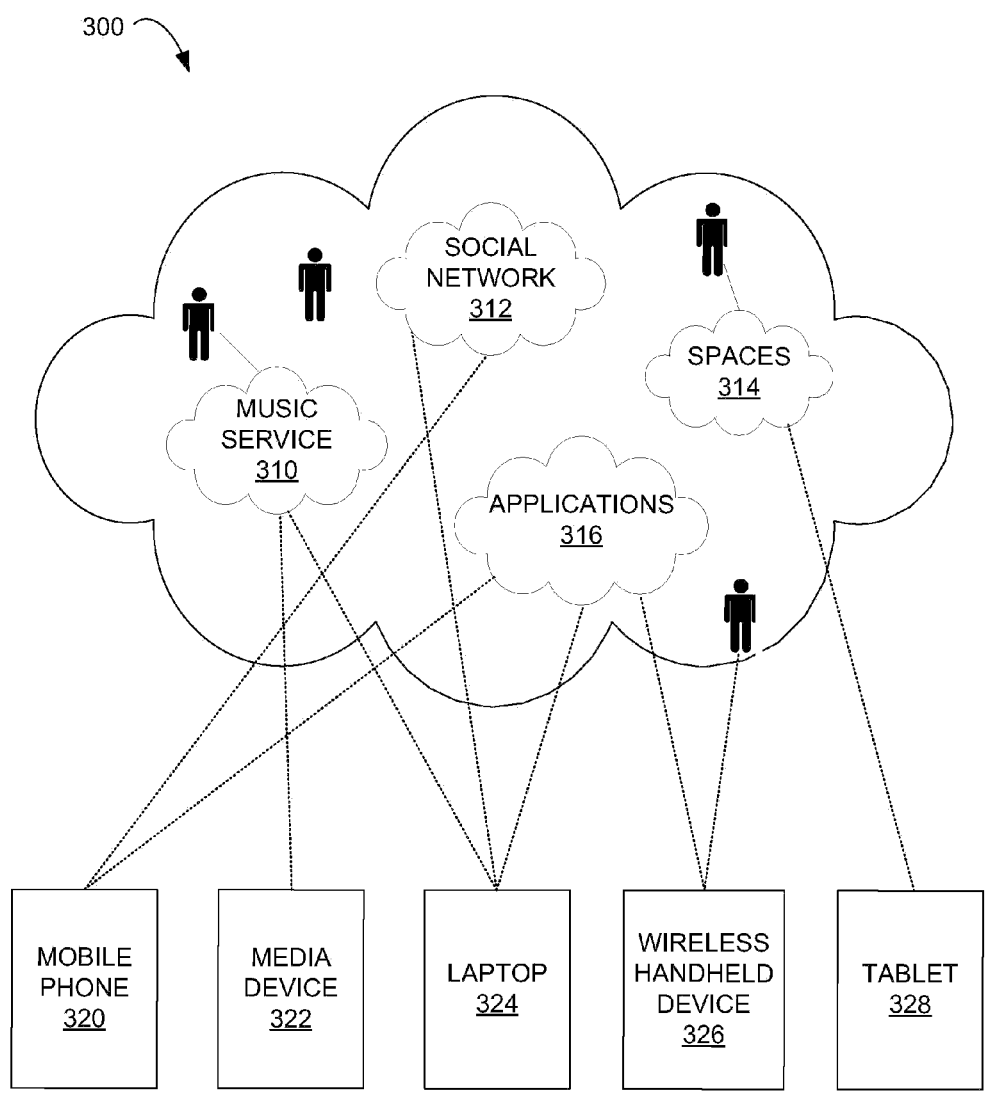
FIG. 3 illustrates a computing environment with multiple devices accessing multiple services.

FIG. 3 illustrates a computing environment 300 with multiple devices accessing multiple services. Computing environment 300 includes a group of services a device may use, including a social network 312, user spaces 314, a music service 310, and applications 316, as examples. FIG. 3 also shows multiple devices including a mobile phone 320, a media device 322, a laptop 324, a wireless handheld device 326 and a tablet 328, as examples. Each of these devices may access some of the group of services as depicted in computing environment 300. In this illustration, each of these devices use a client runtime that was specifically developed for that combination of device and the service being used.

Figure 4:
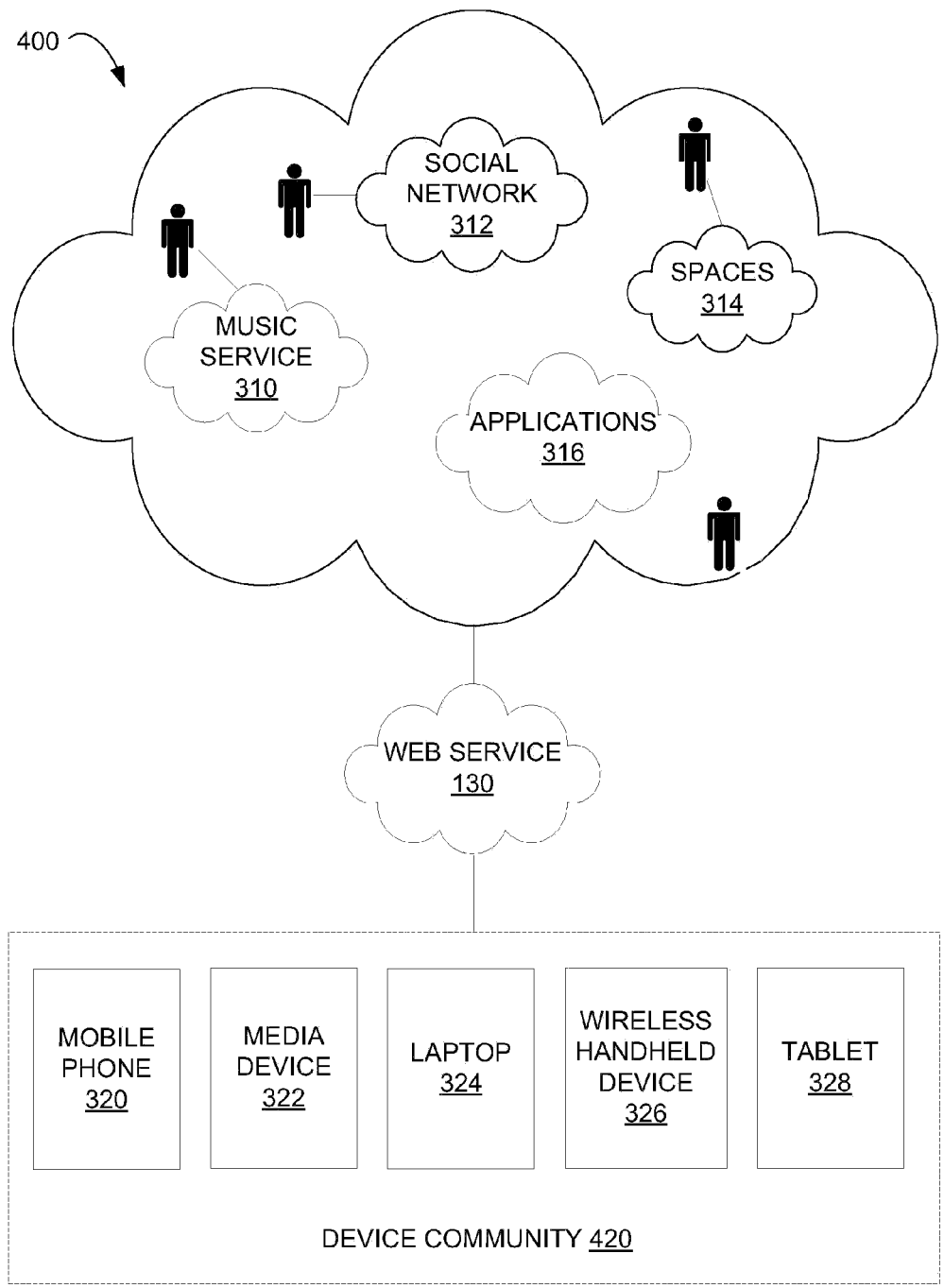
FIG. 4 illustrates a computing environment including an embodiment web service for network based JIT compilation of runtime files for a set of disparate devices.

Referring now to FIG. 4, a computing environment 400 is illustrated that includes a web service 130 to centralize device services and provide network based compilation of runtime files for a set of disparate devices is illustrated. In this example, web service 130 is shown in communication with the group of services and with a device community 420 including each of the devices depicted in FIG. 3. In this way, the web service 130 can aggregate the devices and subscribe those devices to services to share and distribute the service or content that a user is interested in. Web service 130 therefore allows a user to define specific services from multiple sources, and then run these different services using client runtimes specifically compiled for each of the devices in a device community 420 of that user.

It will be appreciated that the embodiments described herein may be implemented, for example, via computer-executable instructions or code, such as programs, stored on a computer-readable storage medium and executed by a computing device. Generally, programs include routines, objects, components, data structures, and the like that perform particular tasks or implement particular abstract data types. As used herein, the term "program" may connote a single program or multiple programs acting in concert, and may be used to denote applications, services, or any other type or class of program. Likewise, the terms "computer" and "computing device" as used herein include any device that electronically executes one or more programs, including, but not limited to, web servers, and any other suitable device that may be configured to provide network based just-in-time compilation for one or more devices.

It will further be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of any of the above-described processes is not necessarily required to achieve the features and/or results of the embodiments described herein, but is provided for ease of illustration and description.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. On a web service, a method of providing network based just-in-time compilation, the method comprising:
   registering with the web service a device having a device profile containing device capabilities, the device being one of a plurality of devices having different device capabilities associated with a user identity;
   receiving via a communication service of the web service a request from a requesting device among the plurality of devices to subscribe to a content service running on one or more of an external service provider and an external content provider, the content service providing a compilation of content corresponding to the user identity for selection from any device of the plurality of devices, wherein at least some content of the compilation of content is not supported by the requesting device;
   upon receiving the request, obtaining device capabilities for the plurality of devices associated with the user identity;
   receiving a selection of selected content from among the compilation of content provided by the content service;
   selecting a selected device from among the plurality of devices appropriate for the selected content from the content service, based on the obtained device capabilities, the selected device not necessarily being the requesting device;
   dynamically performing just-in-time creation of a client runtime specifically configured for the selected device based on the selected device capabilities; and
   performing just-in-time delivery of the client runtime via the communication service to the selected device to provide functionality for the selected device to communicate with the content service through the communication service of the web service to receive the selected content;
   wherein registering a device having a device profile containing device capabilities involves registering a first device having a first device profile, the method further comprising:
      registering a second device having a second device profile, the second device being another of the plurality of devices associated with the user identity; and
      creating a client runtime for the second device corresponding to a device capability contained in the second device profile.

2. The method of claim 1, further comprising:
   logging in to at least one of a plurality of services associated with the user identity in response to a selected device authentication.

3. The method of claim 2, further comprising:
   providing a service directory on the selected device corresponding to the plurality of services; and
   creating a client runtime for the selected device corresponding to at least one of the plurality of services in the service directory in response to a subscription request.

4. The method of claim 1, further comprising:
   after performing just-in-time delivery of the client runtime to the selected device, connecting the selected device with the content service; and
   providing via a pluggable request handler additional functionality to the selected device to communicate with the content service.

5. The method of claim 4, wherein the additional functionality includes at least one of media transcription, content caching, or protocol conversion.

6. The method of claim 1, wherein registering the device further comprises storing the device profile.

7. The method of claim 1, wherein the device capabilities include at least one of a device capability at a user interface level, a transport level, or a protocol level.

8. A system for network based just-in-time (JIT) compilation, the system comprising:
   a web service to register a device and store a device profile comprising device capabilities in memory, the device being one of a plurality of devices having different device capabilities associated with a user identity;
   a protocol endpoint to receive a request from the device to subscribe to a content service, the content service providing a compilation of content to the user identity for selection from any device of the plurality of devices, wherein at least some content of the compilation of content is not supported by the requesting device;
   a runtime service to receive a selection of selected content from among the compilation of content provided by the content service, select a selected device from a plurality of devices appropriate for the selected content, wherein the selected device selected from the plurality of devices appropriate for the selected content is based on obtained device capabilities, the selected device not necessarily being the requesting device, and dynamically perform just-in-time creation of a client runtime specifically configured for the selected device based on selected device capabilities contained in the device profile for the selected device, the client runtime configured to communicate with the content service when run on the selected device to receive the selected content from an external content service; and
   a communication service to perform just-in-time delivery of the client runtime to the selected device and to provide communication between the client runtime on the selected device and the content service upon receipt of the client runtime by the selected device;
   wherein registering a device having a device profile containing device capabilities involves registering a first device having a first device profile, the method further comprising:
      registering a second device having a second device profile, the second device being another of the plurality of devices associated with the user identity; and
      creating a client runtime for the second device corresponding to a device capability contained in the second device profile.

9. The system of claim 8, wherein the user identity corresponds to a plurality of services, wherein the web service further comprises an identity service to associate the user identity with the device, wherein the web service uses the identity service to log in to at least one of the plurality of services in response to a device authentication.

10. The system of claim 9, wherein the web service is configured to provide a service directory corresponding to the plurality of services, and the runtime service is configured to create a client runtime for the selected device corresponding to at least one of the plurality of services in the service directory in response to a subscription request.

11. The system of claim 10, wherein the runtime service is further configured to create a client runtime for the selected device corresponding to a user selected group of services out of the plurality of services in the service directory.

12. The system of claim 8, further comprising a pluggable request handler to provide additional functionality to the selected device to communicate with the content service.

13. The system of claim 12, wherein the additional functionality includes at least one of media transcription, content caching, or protocol conversion.

14. The system of claim 8, wherein the device capabilities include at least one of a device capability at a user interface level, a transport level, or a protocol level.

15. The system of claim 14, wherein the web service is configured to register a plurality of devices having a plurality of device profiles, and to create a corresponding plurality of client runtimes for the plurality of devices.

16. A non-transitory computer-readable medium comprising stored instructions executable by a computing device to provide network based just-in-time compilation, the instructions being executable to perform a method comprising:
   registering with a web service a device having a device profile containing device capabilities the device being one of a plurality of devices having different device capabilities associated with a user identity;
   receiving a request from the device to subscribe to a content service that provides a compilation of content to the user identity for selection from any device of the plurality of devices, wherein at least some content of the compilation of content is not supported by the requesting device;
   upon receiving the request, obtaining the device capabilities from the device profile;
   receiving a selection of selected content from among the compilation of content provided by the content service;
   selecting a selected device from among the plurality of devices appropriate for the selected content from the content service, based on the obtained device capabilities, the selected device not necessarily being the requesting device;
   dynamically performing just-in-time creation of a client runtime for the selected device based on the obtained device capabilities;
   performing just-in-time delivery of the client runtime to the selected device, the client runtime configured to provide functionality for the selected device to communicate with and obtain the selected content from the content service through the web service;
   after performing just-in-time delivery of the client runtime to the selected device, connecting the selected device with the content service; and
   providing via a pluggable request handler additional functionality to the selected device to communicate with the content service;
   wherein registering a device having a device profile containing device capabilities involves registering a first device having a first device profile, further comprising stored instructions executable for:
      registering a second device having a second device profile; and
      creating a client runtime for the second device corresponding to a device capability contained in the second device profile.

17. The non-transitory computer-readable medium of claim 16, further comprising stored instructions executable for:
   providing a service directory on the selected device corresponding to a plurality of services; and
   creating a client runtime for the selected device corresponding to at least one of the plurality of services in the service directory in response to a subscription request.

* * * * *